Patented Oct. 18, 1927.

1,645,915

UNITED STATES PATENT OFFICE.

CARL J. MALM, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ESTERS OF ORGANIC ACIDS.

No Drawing.   Application filed September 23, 1926.   Serial No. 137,385.

This invention relates to processes of making cellulose esters of organic acids, such for instance as cellulose acetate. One object of the invention is to provide a rapid, economical and easily controlled process which will yield cellulose esters such as cellulose acetate free from serious molecular degradation. Other objects will hereinafter appear.

I have found that cellulosic material may be rapidly, economically and safely esterified, without serious degradation, by treating it with an acylating agent, such as a fatty acid anhydrid, like acetic anhydrid, the action of which is catalyzed by means of one or more of the compounds, $M(ClO_4)_n$ in which M, the positive part, or ion, is less positive than sodium and potassium in the electro-potential scale. The valence of M is indicated by $n$. M represents not only any metal, (except the alkali metals) which forms a perchlorate, but also hydrogen, the ammonium group, and many organic bases which form perchlorates.

The following is an illustrative list of typical perchlorates arranged in decreasing order of effectiveness as catalyzers of the cellulose esterification reaction.

Aluminum perchlorate, copper perchlorate, zinc perchlorate, ammonium perchlorate, methylamine perchlorate, manganese perchlorate, magnesium perchlorate, calcium perchlorate, barium perchlorate, quinoline perchlorate, lead perchlorate, pyridine perchlorate. In order to produce an equal catalyzing effect, the last five compounds in the list must be used in very much larger quantities (ten to one hundred times or more) than the first seven. Sodium and potassium perchlorates produce no effect, and trimethylamine perchlorate very little effect, even when used in large quantities. The perchlorates in the above illustrative list indicate the effectiveness of the perchlorates of the other related metals in the groups of the periodic table of elements. Of the perchlorates of organic bases, methylamine perchlorate is so much more effective than the tertiary amine perchlorates that it, like ammonium perchlorate, groups in with the metal perchlorates.

Because they are more readily accessible, and yet produce excellent results, I prefer to employ the inorganic perchlorates, including hydrogen perchlorate and ammonium perchlorate in this term. The best results are obtained with those that are readily soluble in acetic acid. Magnesium perchlorate is one of the best of these soluble catalyzers, because it gives colorless reaction mixtures, is easily removed from the final product, and is not so powerful a catalyst as to render the reaction difficult to control. Perchloric acid itself acts more rapidly than any of its salts, but, when working on a large scale, the operation is more easily controlled to obtain uniform results when a salt, like magnesium perchlorate, is used.

The amount of catalyst required is small relative to the cellulosic material to be acetylated and relative to the ingredients of the acetylating mass or bath. This aids in making the process economical. The fact that the investment in materials in process is not tied up for excessive periods also makes for lowered costs. Moreover the necessary proportion of acetic anhydrid, the most expensive ingredient, is low.

The temperature of the reaction can be varied over a considerable range but should never be high enough to cause serious molecular degradation of the cellulose acetate, which degradation is shown, for instance, by brittleness of films made from degraded acetate. In the preferred forms of my process the temperatures range between 50 and 65° C., the greater the proportion of catalyst, or the greater its specific catalyzing action, the lower the temperature required. With perchloric acid acetylation can be brought about rapidly at 40° C.

I shall now describe several forms of my invention by way of example, but it will be understood that the invention is not limited to the details thus given, except as indicated in the appended claims. An acetylating bath is prepared by mixing 500 parts by weight of glacial acetic acid with 300 parts by weight of acetic anhydrid. Into this is thoroughly mixed the catalytic agent to be employed, say 2 parts of magnesium perchlorate trihydrate. Into this reaction mass there is introduced 100 parts of the cellulosic material, which may be any of the forms of cellulose customarily used in the manufacture of cellulose acetate, such as cotton, tissue paper, wood pulp, etc. I have found that 100 parts of clean cotton is especially useful when producing high-grade cellulose acetate. The cellulosic material is thoroughly incorporated with the acetylating fluids and the mass maintained at a temperature of 60 to 65° C., until acetylation is completed. One indication of this is the disappearance of the cotton fibers, the reaction mass becoming homogeneous.

In another form of my invention I may substitute in the above example in place of 2 parts of magnesium perchlorate, 0.3 parts of perchloric acid. This is an extremely active catalyst and it is advisable to obtain uniform action through the mass, say by rapid mixing. When working with the acid, temperatures between 50 and 55° C., are safe and useful, although, as stated above, 40° C. is also useful.

In the first example given above, the 2 parts of magnesium perchlorate can be replaced by 1 part of copper perchlorate, the temperature being kept at 60 to 65° C.

Where more speed is desired, the amount of magnesium perchlorate and the amount of copper perchlorate can be increased very greatly without danger of degrading the product. The proportion of perchloric acid can be considerably increased over that given above. Such an increase will give the shortest acetylation of all, and, if the reaction is carried out with care, the product will not be impaired.

In place of the 2 parts of magnesium perchlorate in the first example above, 2 parts of ammonium perchlorate may be substituted.

Even when the amounts of catalysts are cut to half of those mentioned above, the action proceeds nevertheless at a useful rate.

Other metallic perchlorates can be employed as indicated above.

When using my catalysts, the time of acetylation can be readily controlled. For example, I have obtained complete acetylation in as short a time as three hours with perchloric acid as the catalyst, the temperature not exceeding 65° C., and I have obtained an acetylation with metallic perchlorates in 10 to 20 hours. But these are merely illustrative and even shorter times can be obtained by the use of more catalyst and increased temperature, care being taken to make the action uniform throughout the reaction mass.

After the latter has become sufficiently clear to indicate the completion of esterification, subsequent treatment follows the customary practice. For example, when the ester is cellulose acetate, it is hydrolyzed to the desired extent to produce solubility in desired organic solvents. Thus the chloroform-soluble cellulose acetate, initially formed, can be hydrolyzed into acetone-soluble celluose acetate. The acetic values may be recovered by precipitating and washing the cellulose acetate with water and concentrating from the latter, or they may be recovered by evaporation and condensation. To facilitate the latter operation, the reaction mixture may be spread into the form of films or brought into the form of powder by stirring or spraying, as set forth in the prior art.

The hereinabove mentioned catalytic perchlorates are very effective in esterifying cellulose under conditions in which the esters are not dissolved but remain in the fibrous form. For example, 5 parts by weight of cotton are placed in a solution of 50 parts of acetic acid containing 1 part of magnesium perchlorate trihydrate. After the cotton is thoroughly impregnated with the solution (say after 24 hours) the cotton is removed from the bath and pressed until its total weight amounts to 15 parts by weight. This mass is suspended in a mixture of 80 parts by weight of carbon tetrachlorid and 25 parts of acetic anhydrid and the whole is maintained at 50° to 55° C. until a sample, after washing and drying, is wholly soluble in chloroform.

The perchlorate catalysts are effective for other esters. For example, 4 parts by weight of cellulose are mixed with 30 parts of propionic acid, 30 parts of propionic anhydrid, and one part of magnesium perchlorate trihydrate. The mixture is kept at 60° to 65° C. for 24 hours or until it has become homogeneous. On pouring into cold water, cellulose propionate is precipitated. It is purified and dried by known methods. Butyric acid and anhydrid may be similarly used.

Having thus described my invention, what I claim as new and desire to secure by Letters Patent is:

1. The process of making cellulose esters of organic acids which includes the step of treating cellulosic material with an acylating agent and catalyzing the reaction with $M(ClO_4)_n$, where M is the positive ion and is less positive than sodium and potassium in the electro potential scale and $n$ is the valence of M.

2. The process of making cellulose acetate which includes the step of treating cellulosic material with an acetylating fluid comprising acetic anhydrid and catalyzing the reaction with an inorganic perchlorate in which the positive ion is less positive than sodium and potassium in the electro potential scale.

3. The process of making cellulose acetate which includes the step of treating cellulosic material with an acetylating mixture comprising acetic anhydrid and acetic acid, and catalyzing the reaction with an inorganic perchlorate soluble in acetic acid and in which the positive ion is less positive than sodium and potassium in the electro potential scale.

4. The process of making cellulose acetate which includes the step of treating cellulosic material with an acetylating mixture comprising acetic anhydrid and acetic acid, the treatment being carried out in the presence of magnesium perchlorate as a catalyst.

Signed at Rochester, New York this 17th day of September 1926.

CARL J. MALM.